Jan. 8, 1929.　　　　　　　　　　　　　　　　　　1,698,316
G. R. McDONALD
DIFFERENTIAL FREQUENCY RELAY
Filed May 6, 1925
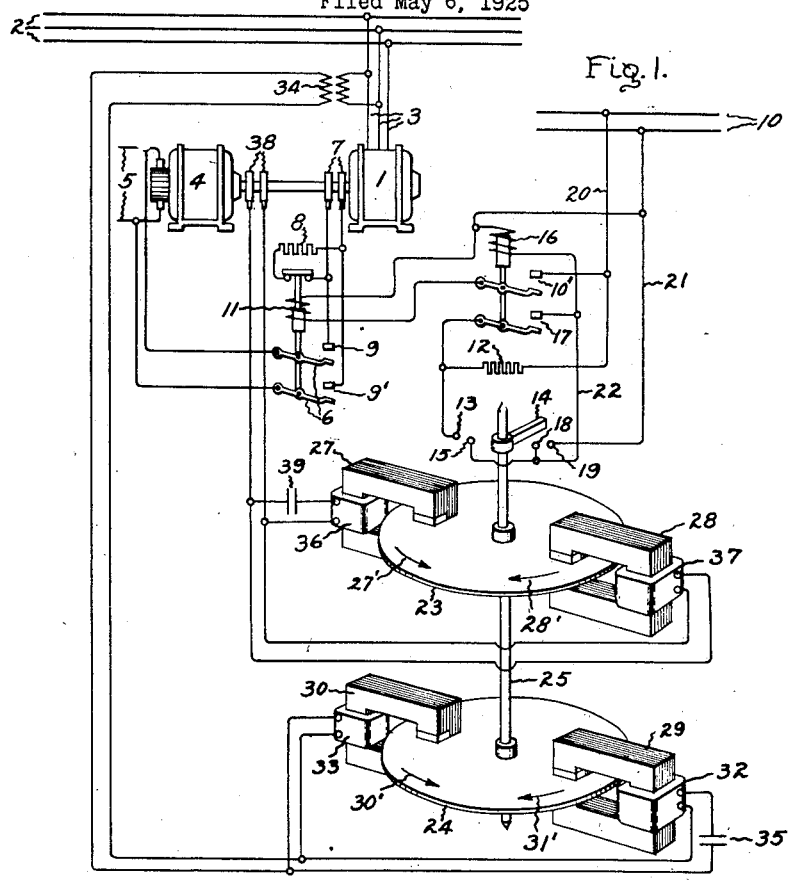
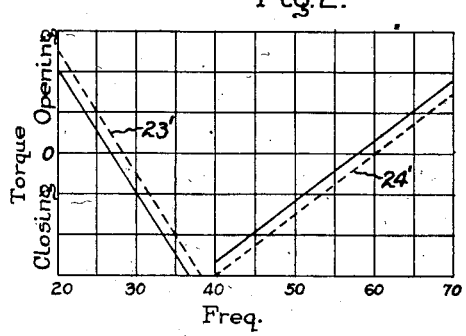
Inventor
Gordon R. McDonald
by _His Attorney_

Patented Jan. 8, 1929.

1,698,316

UNITED STATES PATENT OFFICE.

GORDON R. McDONALD, OF SCHENECTADY, NEW YORK, ASSIGNOR TO GENERAL ELECTRIC COMPANY, A CORPORATION OF NEW YORK.

DIFFERENTIAL FREQUENCY RELAY.

Application filed May 6, 1925. Serial No. 28,489.

My invention relates to means for producing an effect dependent on the relation between the frequencies of different electrical systems, and has for its object the provision of an improved control device which operates in response to the establishment of a predetermined relation between the system frequencies and is unaffected by the relation between the system voltages.

It is sometimes desirable to produce operation of a device when a fixed percentage difference is established between the frequencies of different electrical systems. Thus, when a synchronous motor supplied with power from an alternating current power system and provided with a high resistance winding on the same core member as its field winding is utilized to drive an electric generator for supplying current to a distribution system, it is desirable that the field circuit of the motor be closed when the generator speed or a frequency dependent thereon has attained a predetermined relation to the frequency of the power system and that the field circuit of the motor be opened when a fixed percentage difference exists between the frequency, which is a measure of the generator speed and the frequency of the power system. In accordance with my invention, these results are produced through an improved control device comprising motor elements arranged to produce a resultant torque of a value dependent on the percentage difference between the frequency dependent on the generator speed and the frequency of the power system.

My invention will be better understood from the following description when considered in connection with the accompanying drawing and its scope will be pointed out in the appended claims.

Referring to the drawings, Fig. 1 shows an arrangement wherein my invention has been embodied; and Fig. 2 illustrates the operating characteristics of the apparatus shown in Fig. 1.

Fig. 1 shows a synchronous motor 1 connected to the alternating current power line 2 through conductors 3 and arranged to drive a generator 4 from which current may be supplied to a distribution circuit indicated by lines 5 and to the field circuit of the motor 1 through a switch 6 and slip rings 7. A resistor 8 is arranged to be connected across the slip rings 7 for preventing arcing at the contacts 9 and 9' of the switch 6 when it is opened. A source of current, indicated by the lines 10, is provided for supplying current through a switch 10' to the operating coil 11 of the switch 6 and through resistor 12, fixed contact member 13, movable contact member 14 and fixed contact member 15 to the operating coil 16 of the switch 10' and a switch 17 which completes a holding circuit for the switch 10' in its closed position. With these connections the switch operating coil 16 is energized through the holding circuit independently of the contact members 13, 14 and 15 and the movable contact member 14 may be moved out of engagement with fixed contacts 13 and 15 without causing the switch 10 to be opened. In its right hand position, the movable contact member engages fixed contacts 18 and 19, thereby short circuiting the switch operating coil 16 through conductors 20, 21 and 22 in a manner to cause the switches 6, 10' and 17 to be opened.

The movable contact member 14 is coupled to the rotor elements 23 and 24 through a shaft 25, and its position in space is determined by the relation between the fluxes produced through shading ring stator elements 27, 28, 29 and 30. The field coils 32 and 33 of the stator elements 29 and 30 respectively are connected to the line 2 through leads 3 and a transformer 34, phase modifying means shown as a condenser 35 being connected in the circuit of the coil 32. The field coils 36 and 37 of the stator elements 27 and 28 respectively are supplied from the generator 4 through slip rings 38 with a current whose frequency is dependent on the speed of the generator, a condenser 39 being connected in the circuit of the coil 36. The stator elements 27 and 28 are arranged to cause opposed torques to be exerted on the rotor element 23 and the stator elements 29 and 30 are arranged likewise to cause opposed torques to be exerted on the rotor element 24.

It will be readily understood that the resultant torques exerted on the rotor elements 23 and 24 through their respective stator members will vary with changes in the operating speed of the generator 4 and the frequency of the line 2 because of the fact that the condensers 35 and 39 are connected in the circuits of coils 32 and 36 respectively; that the stator elements 29 and 30 may be adjusted to produce opposed torques which are equal when the line 2 is operating at its normal frequency; that the stator elements 27 and 28 may be adjusted likewise to produce opposed torques which are equal when the generator 4 is operating at its normal speed; that assuming the frequency of the line 2 to be normal, the torque of the stator element 27 will predominate when the speed of the generator 4 is above normal and the torque of the stator element 28 will predominate when the generator speed is below normal; and that assuming the speed of the generator 4 to be normal, the torque of the stator element 29 will predominate when the frequency of the line 3 is above normal and the torque of the stator element 30 will predominate when the line frequency is below its normal value. The relation between the torques exerted on the rotor elements 23 and 24 through the stator elements 27, 28, 29 and 30 are indicated by the arrows 27′, 28′, 30′ and 31′ placed on the rotor elements. The manner in which the resultant torque exerted on the rotor element 23 through the stator elements 27 and 28 varies with the generator speed or the frequency dependent thereon is indicated by the curve 23′ of Fig. 2, and the relation between the line frequency and the resultant torque exerted on the rotor element 24 through the stator elements 29 and 30 is indicated by a curve 24′.

In explaining the operation of the device, it will be assumed that the normal frequency of the line 2 and the frequency dependent on the speed of the generator 4 are 60 and 30 cycles respectively and that it is desired to effect the closure of the motor field switch 6 when the ratio between the frequency, dependent on the generator speed, and the line frequency equals or exceeds a predetermined value, for example 0.475. Taking first the case where the line frequency is normal and the generator speed is low, the curve 23′ shows that an "opening" torque is exerted on the rotor element 23 so long as the generator 4 is operating at a speed corresponding to a frequency below approximately 28.5 cycles and the contact member 14 is thereby maintained out of engagement with the contacts 13 and 15. At a generator speed above that corresponding to about 28.5 cycles, a closing torque is exerted on the rotor element 23 and the contact member 14 is caused to engage the contacts 13 and 15, thereby effecting the closure of the switches 10′, 17 and 6 at a generator speed corresponding to substantially 28.5 cycles or 47.5% of the normal line frequency. Should the generator 4 decelerate to a speed below that corresponding, for example, to 28.5 cycles, an opening torque of increasing magnitude will be exerted on the rotor element 23 and the contact member 14 will be brought into engagement with the contacts 18 and 19, thereby short-circuiting the switch operating coil 16, causing the switches 10′, 17 and 6 to be opened and causing the field circuit of the motor 1 to be deenergized.

In the foregoing explanation, it was assumed that the line frequency was maintained constant. It will be apparent, however, that the line frequency may vary. Assuming the line 2 to be operating at 58 cycles, for example, curve 24′ shows that a substantial closing torque is exerted on the rotor element 24 through the stator elements 29 and 30. Under these conditions, engagement of the contact member 14 with the contacts 13 and 15 will be produced when the opening torque exerted on the rotor element 23 through the stator members 27 and 28 becomes less than the closing torque exerted on the rotor element 24 through the stator elements 29 and 30. Referring to the curves 23′ and 24′, it will be observed that the closing torque of the rotor element 24 will predominate when the frequency, corresponding to the generator speed has increased to about 27.5 cycles. As in the case where the line frequency was assumed to be constant, the switch 6 is operated when the ratio between the frequency dependent on the generator speed, and the line frequency equals or exceeds substantially the value 0.475. Likewise, when the line frequency is above normal, an opening torque will be exerted on the rotor element 24. A greater closing torque will then have to be exerted through the rotor element 23 to cause engagement of the contact member 14 with the contacts 13 and 15, and energization of the motor field will be caused when the ratio between the frequency dependent on the generator speed, and the line frequency equals or exceeds substantially the value 0.475. It will be apparent to those skilled in the art that the stator elements 27, 28, 29 and 30 may be adjusted to cause energization of the motor field circuit when any desired relation has been established between the frequency dependent on the generator speed, and the line frequency.

It has been observed that when the line 2 is operating at a frequency of 58 cycles, a substantial closing torque is exerted on the rotor element 24. Under these conditions, the contact member 14 is moved into engagement with the contacts 13 and 15 when the generator voltage is zero or very low. The contact member 14, however, is disengaged from these contacts when the generator speed and voltage have increased to a predetermined value and is moved into engagement with these contacts again when the opening torque exerted on the rotor element 23 decreases to a value below that of the closing torque exerted on the rotor element 24. In order to prevent engagement of the member 14 with the contacts 13 and 15 when the voltage of the generator is low, the stator elements 27, 28, 29 and 30 are adjusted to produce the torque frequency characteristics shown by the full line curves of Fig. 2. This adjustment does not alter the opening and closing characteristics of the device previously described and is advantageous in that the rotor element is caused to produce an opening torque by which the contact member 14 is biased away from the contacts 13 and 15 within the range of possible variation in the line frequency.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of a plurality of alternating current systems, a device to be operated, a plurality of shading ring motors grouped in pairs each connected to a different one of said systems in a manner to produce a torque dependent on the frequency of the system to which it is connected, and means controlled in accordance with the resultant torque produced by said motor pairs for causing said device to be operated when a predetermined relation has been established between the frequencies of said systems.

2. The combination of a plurality of pairs of motor elements, a plurality of alternating current systems each connected to a different pair of said motor elements in a manner to produce opposed torques having resultant values dependent on the frequencies of said systems, a device to be operated, and means operable in accordance with the resultant of said values for controlling the operation of said device.

3. The combination of a plurality of motor elements, an alternating current system connected to one of said motor elements directly and to another of said motor elements through phase modifying means, a second alternating current system connected to means for producing a torque dependent on the frequency of said second system, a device to be operated, and means operable in response to the resultant torque of said motor elements and said torque producing means for causing said device to be operated when a predetermined relation has been established between the frequencies of said systems.

4. The combination of a synchronous motor, means for producing a torque dependent on the frequency of the current supplied to said motor, a generator arranged to be driven by said motor, means for producing a torque dependent on a frequency corresponding to the speed of said generator, means comprising an operating coil for controlling the field circuit of said motor, and means for causing said operating coil to be energized and deenergized in response to a change in the relation between the torques of said torque producing means.

5. The combination of a synchronous motor, means for producing a torque dependent on the frequency of the current supplied to said motor, a generator arranged to be driven by said motor, means for producing a torque dependent on a frequency corresponding to the speed of said generator, means comprising an operating coil for controlling the field circuit of said motor, means for causing said operating coil to be energized and deenergized in response to a change in the relation between the torques of said torque producing means, and means operable to form a holding circuit for said coil when the field circuit of said motor is energized.

6. The combination of a plurality of shading ring motors, a synchronous motor having its armature winding interconnected with one of said shading ring motors directly and with another of said shading ring motors through phase modifying means for producing a resultant torque dependent on the frequency of said synchronous motor, a generator arranged to be driven by said synchronous motor and inter-connected with one of said shading ring motors directly and with another of said shading ring motors through phase modifying means for producing a torque dependent on a frequency corresponding to the speed of said generator, synchronous motor field circuit control means comprising an operating coil, and means operable in accordance with the resultant torque of said shading ring motors for controlling the energization of said coil to close and open said field circuit when predetermined relations have been established between the frequency of said synchronous motor and the frequency corresponding to the speed of said generator.

In witness whereof, I have hereunto set my hand this 4th day of May, 1925.

GORDON R. McDONALD.